United States Patent [19]

Dougherty

[11] Patent Number: 5,425,684

[45] Date of Patent: Jun. 20, 1995

[54] VARIABLE SPEED POWER TRANSMISSION MECHANISM

[76] Inventor: Harold F. Dougherty, R.R. 2, Box 2E, Burchard, Nebr. 68323

[21] Appl. No.: 246,925

[22] Filed: May 20, 1994

Related U.S. Application Data

[63] Continuation-in-part of Ser. No. 90,491, Jul. 12, 1993, abandoned.

[51] Int. Cl.⁶ .................................... F16H 15/12
[52] U.S. Cl. ................................ 476/23; 476/54
[58] Field of Search ............ 476/21, 23, 24, 25, 476/26, 31, 50, 54, 56, 57, 58

[56] References Cited

U.S. PATENT DOCUMENTS

| | | | |
|---|---|---|---|
| 806,302 | 12/1905 | Starr | 476/31 X |
| 846,592 | 3/1907 | Maurer | 476/58 X |
| 1,165,354 | 12/1915 | Wray | 476/50 |
| 1,215,076 | 2/1917 | Tabor | 476/50 |
| 2,057,482 | 10/1936 | Erban | 476/50 X |
| 2,481,315 | 9/1949 | Lehnert | 476/21 |
| 3,613,814 | 10/1971 | Prien | 180/19 |
| 3,631,730 | 1/1972 | Hadler | 74/194 |
| 3,813,959 | 6/1974 | Price et al. | 74/194 |
| 3,986,414 | 10/1976 | Peterson et al. | 74/691 |
| 4,498,552 | 2/1985 | Rouse | 180/70.1 |

FOREIGN PATENT DOCUMENTS

| | | | |
|---|---|---|---|
| 204637 | 11/1908 | Germany | 476/57 |
| 2005443 | 8/1971 | Germany | 476/24 |
| 117900 | 8/1918 | United Kingdom | 476/57 |

*Primary Examiner*—Allan D. Herrmann
*Attorney, Agent, or Firm*—Philip J. Lee

[57] ABSTRACT

A power transmission device comprises a central shaft supporting an axially fixed and rotationally free sleeve with an axially displaceable drive wheel and a fixed pulley for receiving input power mounted thereon, an output sleeve being rotationally free but axially fixed with respect to the central shaft on which output sleeve is fixed and with an output sprocket and a rotationally fixed but axially displaceable take off wheel mounted thereon, and two transfer disks with flat round surfaces for engaging the outer surfaces of the drive wheel and power take off wheel to transfer power from the drive wheel to the take off wheel in accordance with the ratio of the relative distances of the drive wheel and take off wheel to the center of the transfer disks, direction of rotation of the take off wheel reversing as the axial displacement of the take off wheel causes it to pass the center of the transfer disks. The transfer disks are releasibly engageable with power take off wheel and drive wheel. The device when arranged with a central input device and two output sleeves on either side of power input device, providing a mechanism for controllably varying two power outputs in unison or separately.

16 Claims, 8 Drawing Sheets

VARIABLE SPEED POWER TRANSMISSION MECHANISM

RELATED APPLICATIONS

This application is a Continuation-In-Part of a previous application filed in the United States Patent and Trademark Office by HAROLD F. DOUGHERTY on Jul. 12, 1993, titled "VARIABLE SPEED POWER TRANSMISSION MECHANISM" and assigned Ser. No. 08/090,491, now abandoned.

BACKGROUND OF THE INVENTION

A. Field of Invention

The present invention relates generally to power transmission mechanisms, and more particularly to a new and improved means for providing a variable speed transmission with reversible power output.

B. Description of Related Art

A number of relatively simple mechanical power transmission devices exist wherein the essential power transfer mechanism involves a friction disc which is rotated by the power source and the spinning disc surface is impacted by a driven wheel that is aligned such that the axis of the driven wheel is parallel to a radius of the friction disc. In such devices, the power output is varied by radially altering the displacement of the driven wheel from the center point of the friction wheel and the point of engagement of the driven wheel and friction disc. Examples of such devices include U.S. Pat. No. 3,818,954 to Price; U.S. Pat. No. 3,631,730 to Hadler; U.S. Pat. No. 4,498,552 to Rouse; and U.S. Pat. No. 3,613,814 to Prien. Since the common usage of such devices is to transmit power to wheels to propel mowers or other small vehicles, it would be beneficial if the device was capable of reversing the power output and in particular of reversing power direction without disengaging the power as a required step in the reversing process. In addition, it would be advantageous to utilize the power transmission device to provide a steering function. Steering by means of varying power output to separate wheels requires that the transmission device must be compact and efficiently able to individually alter multiple outputs from a single power source. Of the mentioned devices, the device disclosed in Prien does not appear to reversible, and the Price and Hadler devices require disengagement of power when shifting from a forward speed to reverse. The Price, Rouse and Hadler devices also appear capable of only providing a single power output and are not readily adaptable to separately drive separate wheels at independent speeds, as is necessary to make the variance of power output a means for steering the vehicle utilizing the device as a power transmission. The object of the present invention is to overcome the limitations of the known friction drive mechanisms by providing for the axis of the rotational axis of the power input being parallel to the rotational axis of the power output. It is further desired to provide a power transmission device capable of a smooth and direct transition from forward to reverse speed without the necessity of disengaging the power source with a single control that varies both the speed and the direction of the power output in a continuous manner. Finally, the present invention is designed to overcome the limitations of the cited art of having only a single power output with the effect that a vehicle utilizing the present invention may be steered by independently varying the speed and direction of rotation of two drive wheels.

SUMMARY OF THE INVENTION

The device of the present invention comprises a frictional drive utilizing at least one transfer disk and a drive wheel and a take-off wheel. A rectangular framework for the support of a single output embodiment of the device is formed by ordinary angle iron or other similar beam material and at two opposing sides provides a mounting bracket for receiving a central shaft which in the single output embodiment remains stationary, acting as an axis about which an input drive sleeve and an output drive sleeve are free to rotate, by means of bearings which support the sleeves. Both the input and the output drive sleeves are constrained against axial displacement along the central shaft. The input drive sleeve receives power in the form of rotational torque supplied by any conventional power source conveyed by a gear belt or chain to a gear, pulley or sprocket mounted on the input drive sleeve. The output drive sleeve supports a sprocket, pulley or gear as may be appropriate to provide output of power to wheels or other use. The power input device, whether pulley, sprocket or gear, is coaxial with the central shaft and is rotationally fixed only with respect to the sleeve, being free-wheeling about the central shaft. The power input sleeve comprises central bearings to provide a relatively frictionless support for the sleeve which surrounds without directly contacting the central shaft. The power input sleeve supports a drive wheel having a generally cylindrical radial surface formed of material selected for a high coefficient of friction with abrasion and temperature resistance qualities. The drive wheel is also coaxial with the central shaft and is free to rotate about the central shaft and being rotationally fixed constrained to rotate in unison with the input drive mechanism. The drive wheel is axially displaceable along the power input sleeve. A power take off wheel and an output drive mechanism are mounted on the output drive sleeve with the output drive mechanism farther from the input drive mechanism than the take off wheel. The power take off wheel is supported by a hub and is slidable along the output drive sleeve, but rotationally fixed with respect to the drive shaft by means of a keyway inscribed in the wheel hub section which slidingly receives an axially extended key raised above the surface of the output drive sleeve. Two rod shaped rails are offset above and parallel to the central shaft and provide the support and guidance of two control cars that are axially displaceable along the rails. The axial position of each car is controlled by a control arm which extends from a pivot point attached to the frame to a sliding attachment to the car. A yoke is attached to the take off wheel hub and by attachment to one car controls the location of the take off wheel along the output drive sleeve. The drive wheel is similarly connected to the other car by a yoke. The power take off wheel has a cylindrical surface comprised of a material similar to that of the surface of the drive wheel and is of the same outside diameter as the drive wheel. The output drive mechanism may comprise a variety of means and in the preferred embodiment comprises an annular sprocket fixedly mounted on the output drive sleeve and coaxial with the central shaft. A chain (not shown) would be used in conventional manner to transfer the power from the output sprocket to a sprocket mounted on a drive axle. Alternatively, a pulley and belt or a geared mechanism could be used to transfer power to the final use.

Two opposing transfer disks are mounted within the frame on opposing sides outward of the power drive wheel and the power take off wheel. The transfer disks are aligned such that the central axes of the disks would intersect the central shaft axis if extended. The inside surfaces of the two transfer disks are flat, smooth disks. The transfer disks are mounted by means of a central frictionless hub slidably mounted on axles bolted to the frame on opposite sides of the central shaft. The axles of the transfer disk are short stubs and the transfer wheel hubs comprise a blind bore of depth approximately equal to the length of the axles. The axles do not extend to or through the flat surface of the transfer disks. The distance of travel of the transfer disks is only enough to provide clearance around the drive and take off wheels when the disks are retracted toward the frame. A lever mounted with a fulcrum end attached to the frame and at the other end linked to an opposing and identical lever, is used to force the transfer disks to slide inward toward the drive shaft and to engage with the power drive wheel and power take off wheel. Inward movement of the transfer disks compresses a spring within the hub of each transfer disk which in the absence of activation of the lever, retracts the transfer disks from engagement with the power drive wheel and power take off wheel.

The power drive wheel is set in axial position along the input drive sleeve to engage both transfer disks relatively near the perimeter of each transfer disk. When the transfer disks are moved inward toward the central shaft to engage the power drive wheel, the engagement of the transfer disks with the power drive wheel causes the transfer disks to rotate in opposing directions. The effect of the rotating transfer disks upon the power take off wheel depends upon the axial location of the power take off wheel along the output drive sleeve and central shaft. When the power take off wheel is at the axis of the transfer disks, little, if any, rotational force will be transferred to the output drive sleeve and the output drive mechanism. When the power take off wheel is in a location between the input drive shaft and the axis of the transfer disks, the power take off wheel, the output drive sleeve and the output drive mechanism will be caused to rotate in the same direction as the power drive wheel. When the position of the power take off wheel is between the transfer disk axis and the perimeter of the transfer disks diametrically opposed position to the power drive wheel, the power take off wheel and output drive sleeve will be made to rotate in a direction in opposite to that of the power input device and drive wheel. Assuming the drive wheel location remains constant, as the power take off wheel is moved between its extreme locations along the output drive sleeve, the ratio of the speed of revolution of the power take off wheel and drive shaft will vary according to the change in the distance from the axis of the transfer disks to the point at which the power take off wheel engages the transfer disks. If the location of both the drive wheel and the take off wheel are changed, the speed of revolution of the power take off wheel will be determined by the ratio of the radial distances from the point of the wheels engagement with the transfer disks and the center of the disks. Ignoring loss due to slippage or other factors, if the radial displacement of both the drive wheel ($d_d$) and the power take off wheel ($d_t$) are considered to be positive if toward the power output device and negative if toward the power input device, then the direction and speed of the rotational force put out by the invention ($S_{out}$) in response to a power input ($S_{in}$) can be defined by $S_{in}(d_t/d_d) = S_{out}$ where a positive $S_{out}$ means the rotational direction has not changed and a negative $S_{out}$ value notes the reversal of rotation. Since the axle of the transfer disks also serves as a fulcrum between the force input and the force output, the mechanical advantage of the device is also determined by the ratio of the relative distances to the center point. Since a greater range of variation of speed is available if the rotational direction is reversed and for that reason a negative $S_{out}$ optionally would be linked to drive a vehicle in a forward direction.

A second embodiment of the invention utilizes the general features of the first embodiment with two power output drives operated from a central power input device. In the second embodiment, the central shaft is free to rotate and the input power device comprises a pulley that is centrally rotationally and axially fixed on the shaft. Two drive wheels are also fixedly mounted on the central shaft with one on each side of the input drive device. Two pairs of transfer disks are mounted on axles attached to the frame in similar fashion as in the first embodiment and are positioned such that the two drive wheels engage the transfer disks at their periphery. Two output drive sleeves are coaxial with, and free to rotate about, the central shaft and are located axially outward of the drive wheels. At the farthest ends of the drive sleeves from the input drive device, an output drive device is fixedly mounted on each output drive sleeve. A power take off wheel is mounted on each of the output drive sleeves at a more central location than the output device and are rotationally fixed and axially displaceable along the output sleeve. The axial placement of the power take off wheels is controlled by yokes attaching each wheel to a car supported and guided on rails and controlled by a lever actuated linkage which may control both wheels in unison or separately. The speed and direction of both outputs being separately controllable, the second embodiment can be additionally be used as a means for steering a vehicle by linking the power outputs to separate wheels, for example, the front wheels of a mower, cart of other vehicle. If necessary or useful, the central shaft could be adapted to receive power input at any location and multiple power output devices could be driven and varied separately or in unison as may be desirable.

The purpose and intent of the present invention is to provide a new and improved device for varying the speed and altering the direction of power output from a power source by mechanical means.

A further purpose and intent of the present invention is to provide a new and improved device capable of separately varying the speed and altering the direction of more than one power outputs from a power source by mechanical means.

Other objects and advantages of the invention will become apparent from the Description of the Preferred Embodiment and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
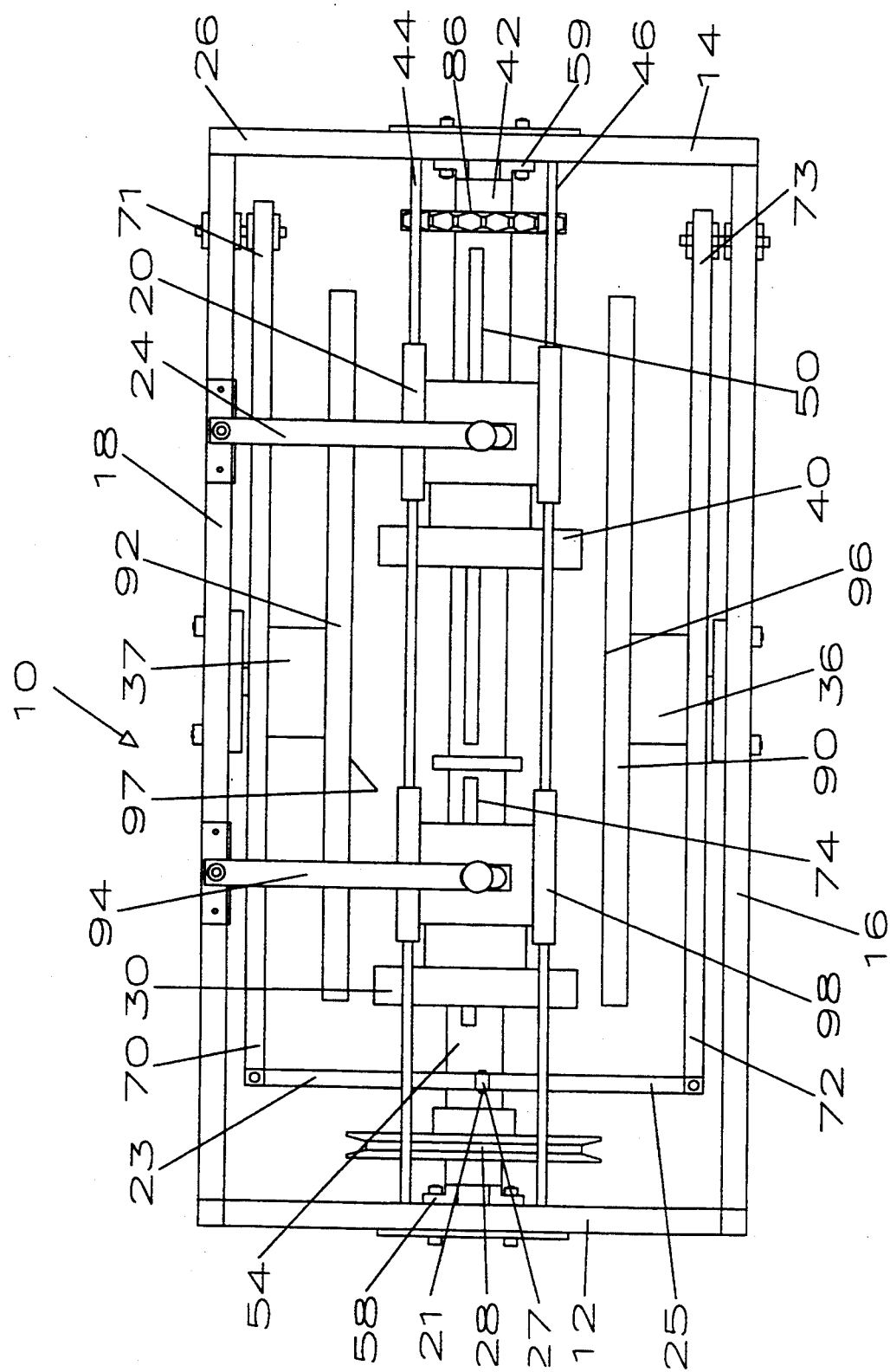
FIG. 1 is a top view of a first preferred embodiment of a device constructed in accordance with the present invention, showing the device unconnected to power source.
Figure 2:
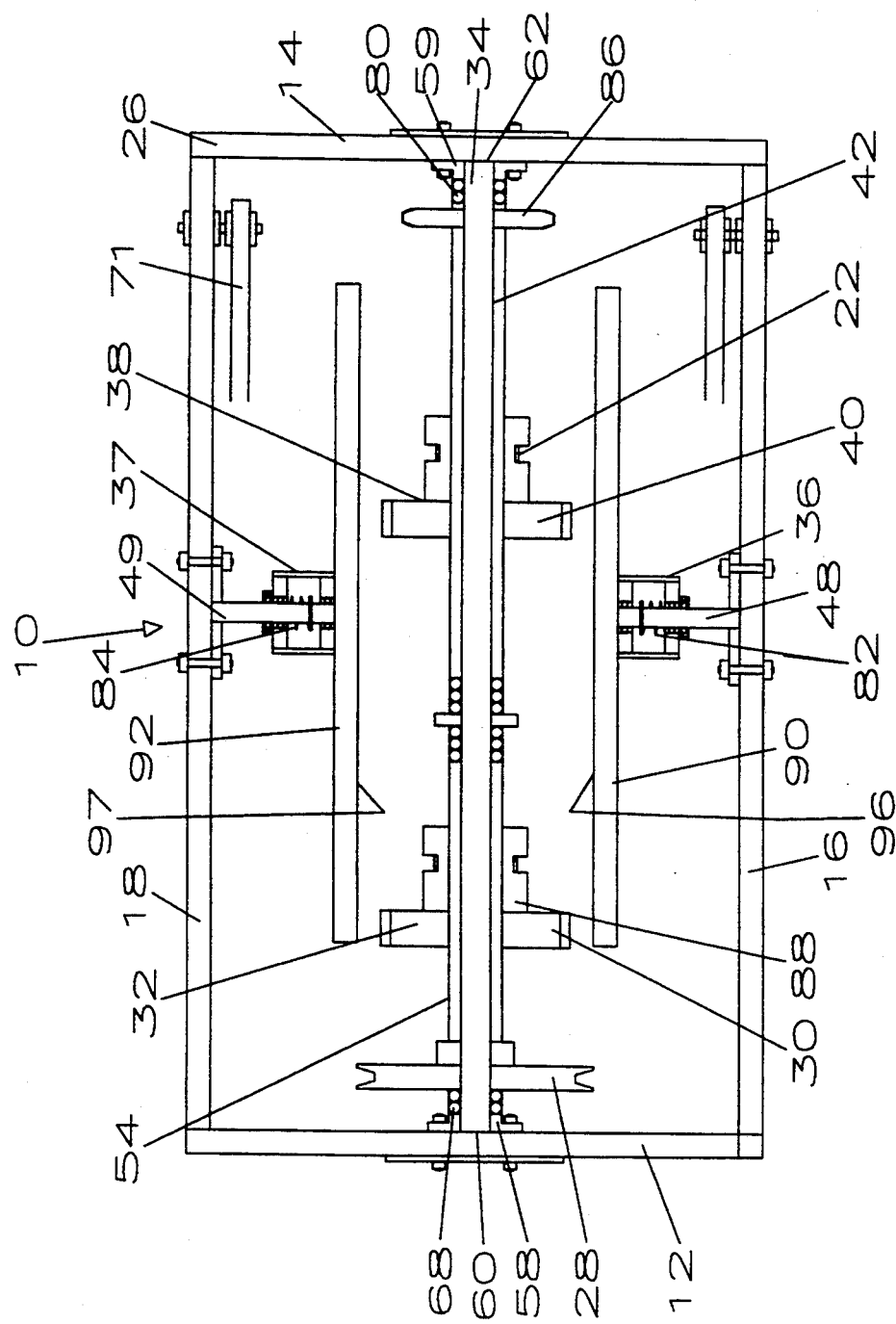
FIG. 2 is a section of a first preferred embodiment of a device constructed in accordance with the present invention, showing the unconnected device, the section being taken along the line 2—2 shown in FIG. 6.
Figure 7:
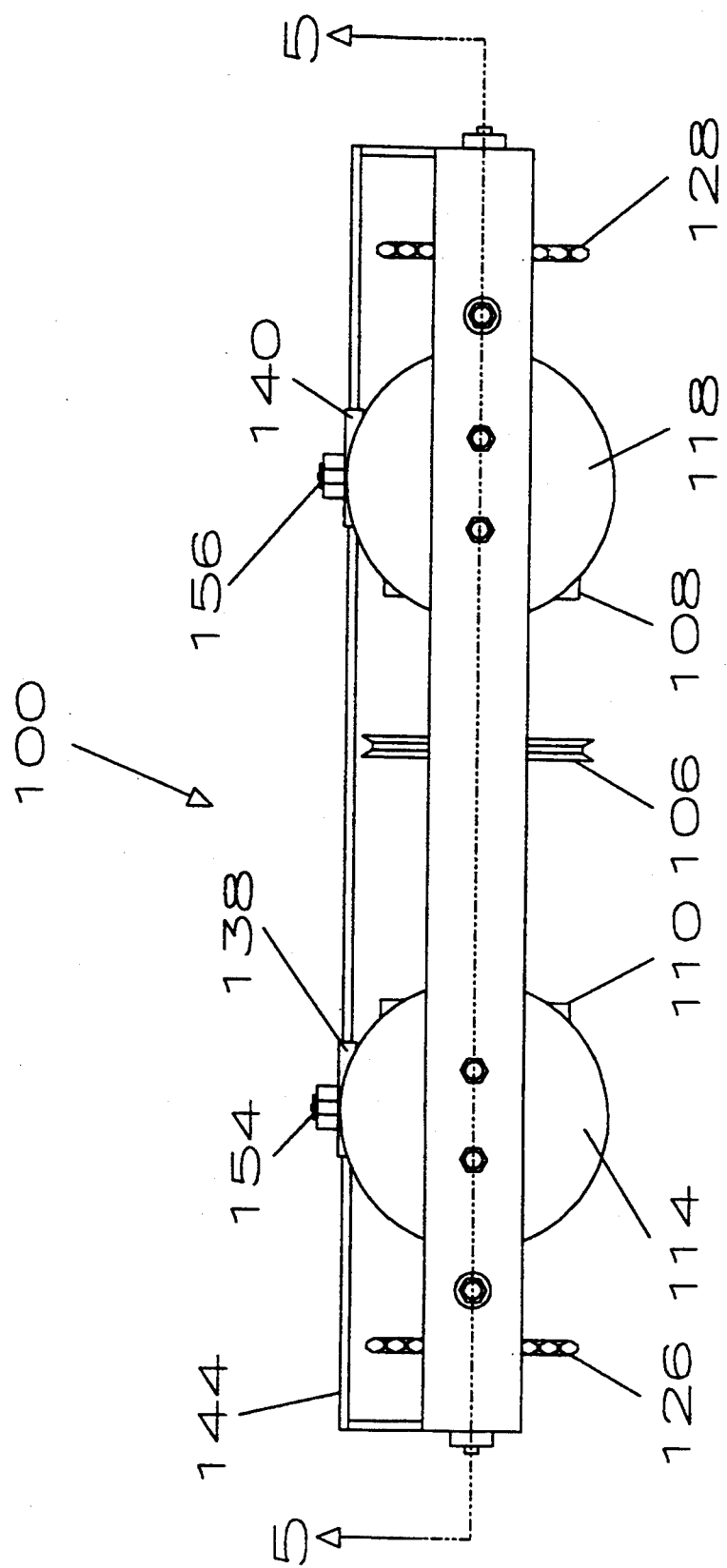
FIG. 7 is a front view of a second embodiment of a device constructed in accordance with the present invention, showing the device unconnected to power source.
Figure 8:
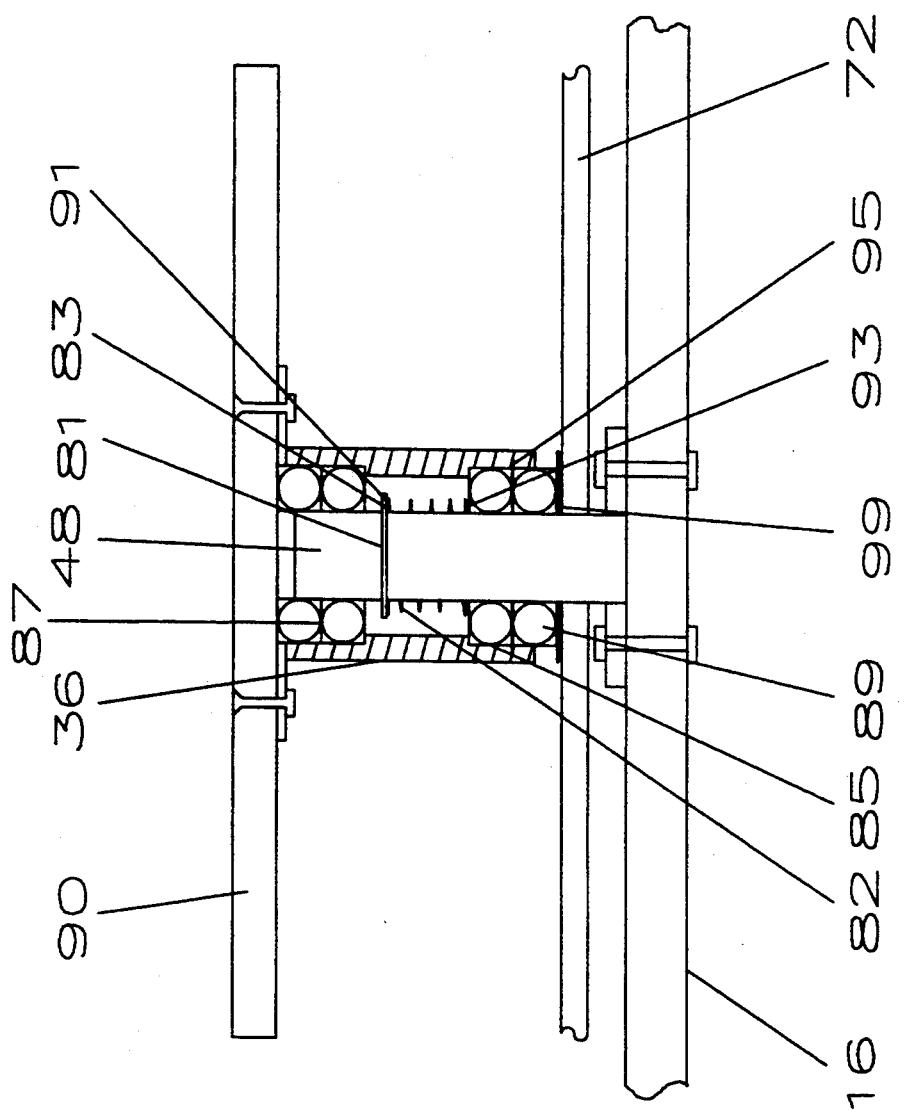
FIG. 8 is a partial section view showing the transfer disk hub and axle mounting mechanism of a device constructed in accordance with the present invention.

With reference to the Drawings wherein like numerals represent like parts throughout the figures, a first preferred embodiment of a variable speed, reversible power transmission mechanism in accordance with the present invention is generally designated by the numeral 10 in FIGS. 1, 2 and 7. The illustrated preferred embodiment of mechanism 10 includes a rectangular framework 26 comprised of straight channel or angle iron beams securely joined at 90° angles at each of the four corners. For ease of reference, two opposing sides 12 and 14 of framework 26 are denoted as the short sides and two opposing sides 16 and 18 of framework 26 are denoted as the long sides, in accord with FIG. 1. It will be appreciated that the exact lengths of sides 12, 14, 16, and 18 are not important to the proper functioning of the mechanism 10, within reasonable limits. A central shaft 34 (FIG. 2) is supported within and by framework 26 and in the illustrated preferred embodiment, central shaft 34 is located midway between and parallel to the two long sides 16 and 18 of the frame 26. The short sides 12 and 14 of frame 26 support central shaft support brackets 58 and 59, which are bolted thereto. Shaft support bracket 58 is located at the midpoint of the frame short side 12 and shaft support bracket 59 is located at the midpoint of the frame short side 14, placing central shaft 34 on the center line of the frame 26 and of mechanism 10 in general. Central shaft 34 comprises a input drive end 60 and an output drive end 62. Proximate to central shaft input end 60, an input drive sleeve 54 surrounds central shaft 34 and is supported thereon by bearings 68 such that input drive sleeve 54 is free to rotate about central shaft 34. Sleeve 54 is secured against axial displacement along shaft 34. A pulley 28 is fixed to sleeve 54 and is secured against rotation and axial displacement with respect to sleeve 54 while being free to rotate about central shaft 34. When mechanism 10 is installed in an operating vehicle, pulley 28 receives power from a belt driven by a power source (not shown). It is to be anticipated that pulley 28 could be replaced by a gear, sprocket or any functional equivalent and the linkage to the power source may be either direct or indirect. A drive wheel 30 is mounted upon sleeve 54 between the input drive pulley 28 and the center of the frame 26. Drive wheel 30 is secured against rotational movement relative to sleeve 54 and to pulley 28 and is coaxial with central shaft 34. Drive wheel 30 is controllably and axially movable along sleeve 54, and is secured against rotation by an axially extending keyway 74 raised above the surface of sleeve 54 which is slidably receivable into a corresponding key notch which is formed in the hub of drive wheel 30. Drive wheel 30 comprises an annular drive wheel rim 32 on the radially outer edge of drive wheel 30 which rim 32 is formed of a material having a high coefficient of friction and abrasion resistant qualities. Proximate to the output drive end 62, an output drive sleeve 42 surrounds central shaft 34 and is supported thereon by bearings 80. Sleeve 42 is secured against axial displacement along central shaft 34. An output drive sprocket 86 is fixed to sleeve 42 and secured against rotation and axial displacement with respect to sleeve 42. When mechanism 10 is installed in an operating vehicle, sprocket 86 provides output power from a chain driven by an output power use device such as a drive wheel axle (not shown). It is to be anticipated that sprocket 86 could be replaced by a gear, pulley or any functional equivalent and the linkage to the output power use device may be either direct or indirect.

An output power take off wheel 40 is mounted on sleeve 42 and is controllably, axially slidable along sleeve 42. Take off wheel 40 is secured against rotation relative to the sleeve 42 by means of an axially extending keyway 50 and a corresponding key notch in the take off wheel hub that slidingly receives keyway 50. The radially outer surface 38 of power take off wheel 40 is of the same outer diameter as the outer rim 32 of the power drive wheel 30 and is formed of material with similar frictional coefficient and abrasion resistant qualities as the input power drive wheel rim 32. The axial position of power drive wheel 30 is controlled in the preferred embodiment by means of a yoke 88 that is connected to a car 98 that is guided and supported by two guide rails 44 and 46 mounted parallel to each other and to central shaft 34 and displaced from the central shaft 34 to avoid interference with transfer disks 40 and 42. The axial position of car 98 along rails 44 and 46 is determined by means of lever 94. A similar car 20 is mounted on and guided by rails 44 and 46 and attached by yoke 22 to the power take off wheel 40 such that the axial position of car 20 along rails 44 and 46 determines the axial position of take off wheel 40 with respect to power output sleeve 42. The axial position of car 20 with respect to rails 44 and 46 is controlled by lever 24.

Figure 3:
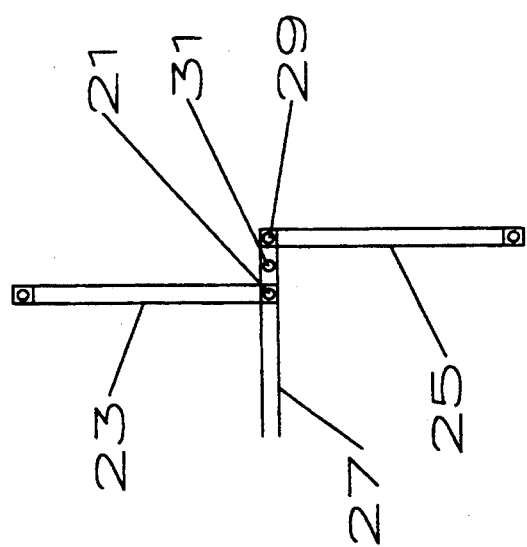
FIG. 3 is a partial section showing the control mechanism of a device constructed in accordance with the present invention.

On frame long sides 16 and 18 there are mounted power drive transfer disks 90 and 92, respectively. Transfer disks 90 and 92 are symmetrical and respectively comprise a inner flat disk-shaped surfaces 96 and 97, both of which disk surfaces 96 and 97 are parallel to each other and to central shaft 34 and are normal to the plane of both input power drive wheel 30 and output power take off wheel 40. Both power transfer disks are lateral to the central shaft 34 and to wheels 30 and 40 and are mounted by means of a central frictionless hubs 36 and 37 slidablely mounted on axles 48 and 49 bolted to the frame 26 on opposite sides of the central shaft 34. The transfer disk axles 48 and 49 are short stubs and do not extend to or through the flat surfaces 96 and 97 of the transfer disks 90 and 92. The distance of travel of the transfer disks 90 and 92 is only enough to provide clearance around the drive wheel 30 and take off wheel 40 when the transfer disks 90 and 92 are retracted toward the frame 26. As shown in greater detail in FIGS. 1 and 3, a lever 70 is mounted with a fulcrum end 71 attached to the frame and at the other end linked to an opposing and identical lever 72 with similar fulcrum end 73. Levers 70 and 72 are used to force the transfer disks 90 and 92 to slide inward toward the central shaft 34 and to engage with the power drive wheel 30 and power take off wheel 40. A linking arm 23 connects leverage 70 to a control lever 27 and linking arm 25 connects lever 72 to control lever 27. Arms 23 and 25 are pivotably connected to control lever 27 at pivot points 21 and 29, respectively, positioned at different locations on lever 27 and on different sides of a point 31 about which lever 27 pivots, such that change in the angle of control lever 27 relative to arms 23 and 25 brings the linked ends of lever 70 and 72 closer together or farther apart. Inward movement of the transfer disk 90 compresses a spring 82 within the hub 36 which spring 82, in the absence of activation of the lever 72, retracts the transfer disk 90 from engagement with the power drive wheel 30 and power take off wheel 40. A similar spring 84 within hub 37 biases transfer disk 92 away from shaft 34. A pin 81 is fixed within a transverse bore through hub axle 48 and retains a washer 83 against axial motion along hub axle 48 in an inward direction, towards central shaft 34. Washer 83 and pin 81 restrain the inner end 91 of spring 82 with respect to hub axle 48. The outer end 93 of spring 82 is restrained by bearing 85 which is secured, with respect to the hub 36 at the outer end thereof by means of a removable snap ring 95 installed within an annular groove on the inside of hub 36. Accordingly, spring 82 is compressed between bearing 85 on the outside, toward the frame, and washer 83 on the inside, toward the transfer disk 90 and central shaft 34, so as to exert a force against bearing 85, thereby biasing the bearing 85, and hub 36 and attached transfer disk 90 in an outward, away from central shaft 34 as well as the drive and take off wheels. Double bearings 87 are fixed within hub 36 by a shoulder within hub 36 at its inner end toward transfer disk 90, and serve to support the inner end of hub 36 by snugly but freely receiving the end of hub axle 48. A second outer bearing 89 is received against the outer side of snap ring 95, and serves as a thrust bearing to convey the force of control lever 72 in against the hub 36 in a frictionless manner. A washer 99 is slidingly mounted on hub axle 48 between the frame and the outer thrust bearing 89 and serves to distribute the force of lever 72 against thrust bearing 89. All transfer disk hubs shown in the Drawings or described herein are similarly constructed, having a pin and washer retain a spring against inward motion with respect to the hub axle and an outer bearing which retains the spring against outward motion with respect to the hub. It is to be anticipated that other methods and devices for retaining a retraction spring may be used with equivalent results. By the opposing actions of levers 70 and 72, and springs 82 and 84, the transfer disks 90 and 92 are controllably displacable towards and away from the central shaft 34 of mechanism 10 such that the outer rims 32 and 38 of both power input drive wheel 30 and power output take off wheel 40 releasably engage both transfer disks 90 and 92. When wheels 30 and 40 are engaged by transfer disks 90 and 92, the input of rotational force on pulley 28 causes input power drive wheel 30 to rotate about the axis of central shaft 34 and the engagement of transfer disks surfaces 96 and 97 with input drive wheel rim 32 causes power transfer disks 90 and 92 to rotate about their respective axes. The engagement of transfer disks inner surfaces 96 and 97 with the outer rim 38 of output power take off wheel 40 causes the output power take off wheel 40 to rotate which in turn causes the output drive sleeve 42 and sprocket 86 to rotate. The speed and direction of rotation of the output drive sprocket 86 is determined by the relative positions of input drive wheel 30 and output power take off wheel 40 with respect to the center of power transfer disks 90 and 92. When rotational force is applied to pulley 28, for any given position of output drive take off wheel 40, the axial position of input drive wheel 30 along central shaft 34 determines the speed of rotation of transfer disks 90 and 92 and therefore the speed of rotation of output power take off wheel 40 and output drive sprocket 86. The speed of rotation of transfer disks 90 and 92 increases as the location of the engagement of input drive wheel surface 32 to transfer disks 90 and 92 approaches the center of transfer disks 90 and 92. The speed of rotation of output power drive take off wheel 40 increases as the point of engagement of output drive wheel surface 38 and the inner surfaces 96 and 97 of transfer disks 90 and 92 approaches the outer perimeter of the inner surfaces 96 and 97 of transfer disks 90 and 92. In addition, the direction of rotation of power drive take off wheel 40 changes as the point of engagement of wheel 40 crosses the center point of the inner surface 96 of transfer disks 90 and 92. When both wheel 30 and wheel 40 engage transfer disks on the same side of the center point of transfer disks 90 and 92, both wheel 30 and wheel 40 rotate in the same direction; when wheels 30 and 40 engage transfer disks 90 and 92 on opposite sides of the center point of transfer disks 90 and 92, the directions of rotation of wheels 30 and 40 are in opposition to each other relative to central shaft 34. Although the output from sprocket 86 could be conveyed to vehicle wheels (not shown) such that the vehicle wheels rotate in either direction relative to the direction of rotation of the output drive take off wheel 40, it is suggested that a wider range of speed variation is possible if the linkage to the vehicle wheels is such that the vehicle wheels are in forward rotation when the output power drive take off wheel 40 is on the opposite side of the center line of disks 90 and 92 from the input drive wheel 30. Faster rotation of the output drive sprocket 86 is obtained when input drive wheel 30 is at the position placing it closest to the center of transfer disks 90 and 92 and the output drive take off wheel 40 is at the farthest distance from the center of transfer disks 90 and 92. Conversely, the slowest rotational output is achieved when input drive wheel 30 is closest to the perimeter of transfer disks 90 and 92 and output power take off wheel 40 is closest to the center of transfer disks 90 and 92. As previously stated, the ratio of the distances from the contact points of the drive wheel 30 and take off wheel 40 with the transfer disks 90 and 92 to the center of the transfer disks 90 and 92 determines the ratio of rotational speed input to output as well as the force input to force output.

Figure 4:
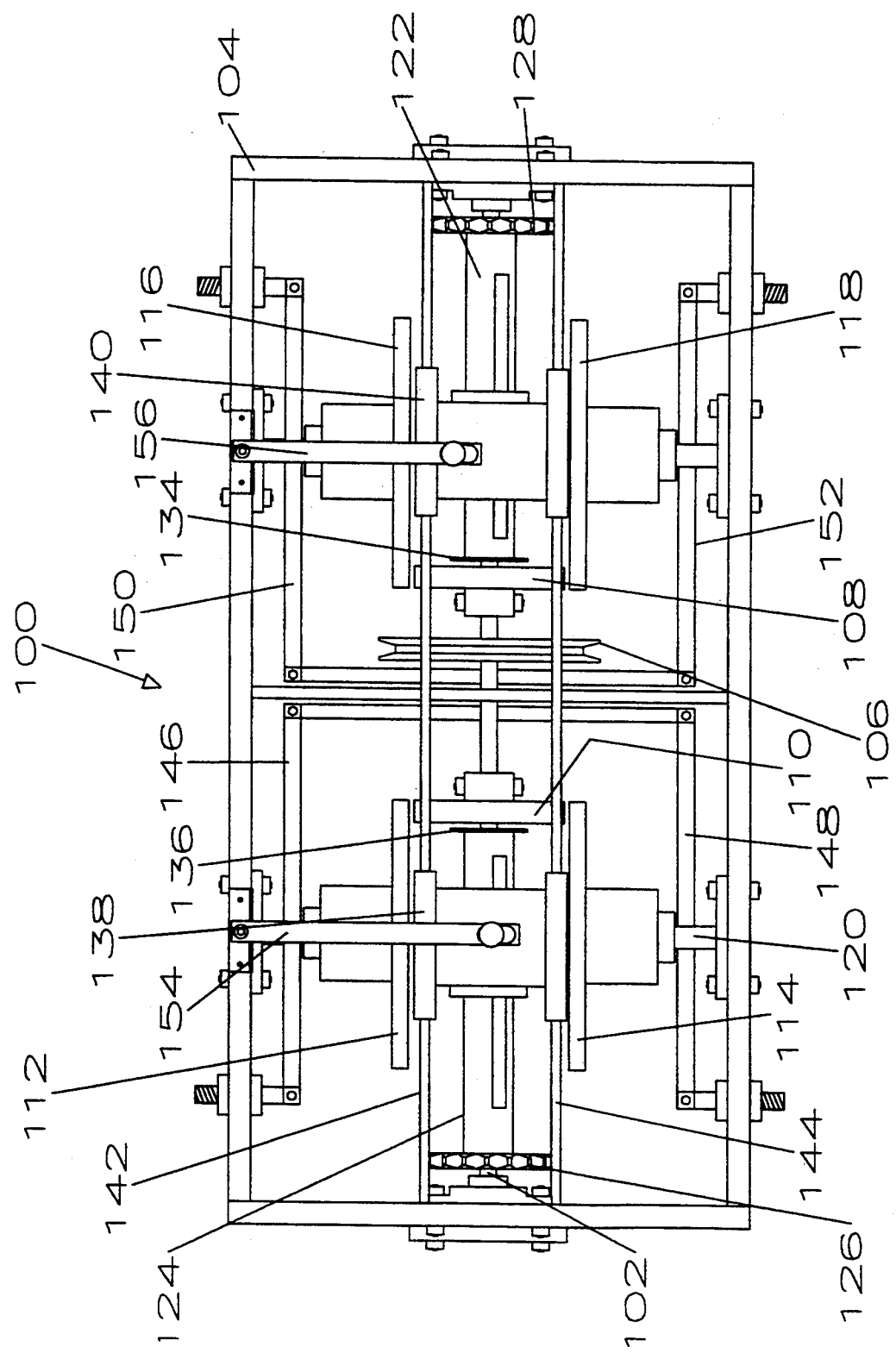
FIG. 4 is a top view of a second embodiment of a device constructed in accordance with the present invention, showing the device unconnected to power source.
Figure 5:
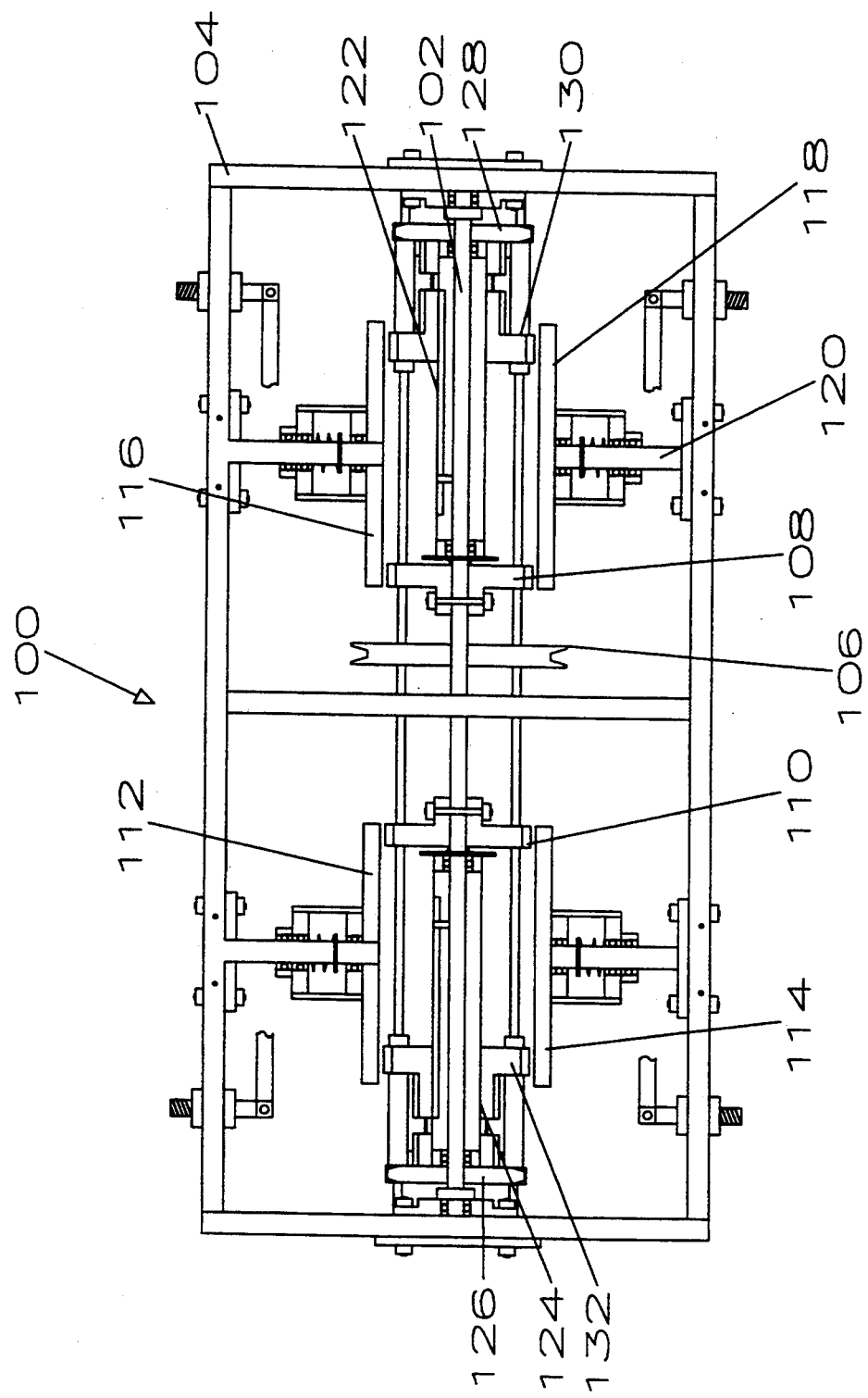
FIG. 5 is a section of a second embodiment of a device constructed in accordance with the present invention, showing the unconnected device, the section being taken along the line 5—5 shown in FIG. 7
Figure 6:
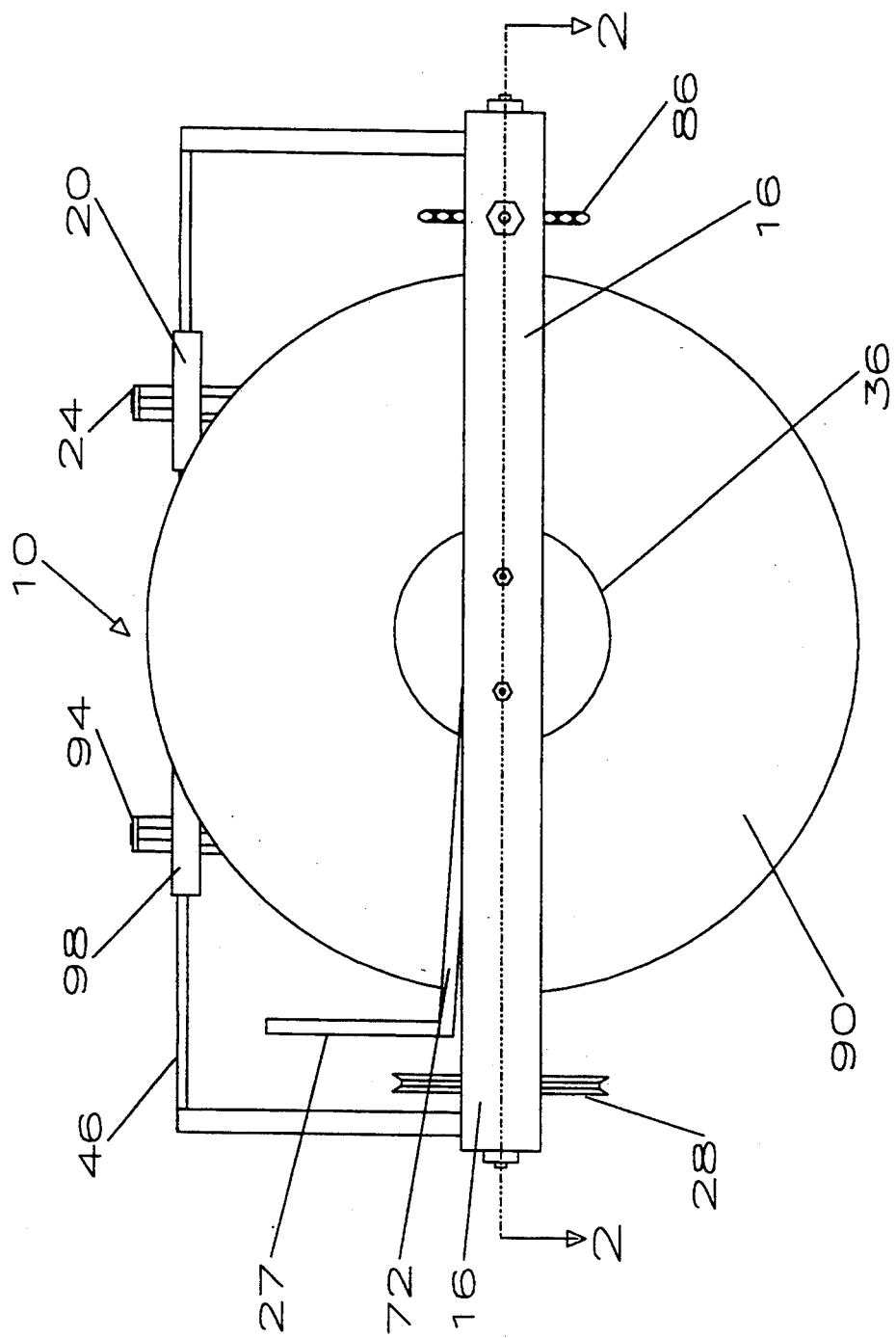
FIG. 6 is a front view of a first preferred embodiment of a device constructed in accordance with the present invention, showing the device unconnected to power source.

A second preferred embodiment of the invention is referenced by numeral 100 in FIGS. 4, 5 and 7 and comprises a central shaft 102 which is rotatable with respect to a rectangular frame 104. In the mechanism 100, the central shaft 102 is free to rotate and an input power device comprises a pulley 106 that is centrally rotationally and axially fixed on the shaft 102. Two drive wheels 108 and 110 are also fixedly mounted on the central shaft 102 with one on each side of the input drive pulley 106. Two pairs of transfer disks 112, 114 and 116, 118 are mounted on axles 120 attached to the frame 104 in similar fashion as in mechanism 10 and are positioned such that the two drive wheels 108 and 110 engage the transfer disks at their periphery closest to pulley 106. Two output drive sleeves 122 and 124 are coaxial with and free to rotate about the central shaft 102 and are axially fixed outward of the drive wheels 108 and 110. Thrust bearings 134 and 136 are used to fix the axial location of sleeves 122 and 124 on shaft 102. At the farthest ends of the output drive sleeves 122 and 124 from the input drive pulley 106, two output drive sprockets 126 and 128 are fixedly mounted on the output drive sleeves 122 and 124. Power take off wheels 130 and 132 are mounted on the output drive sleeves 122 and 124 toward the drive wheels 108 and 110 from the output sprockets 126 and 128 and are rotationally fixed and axially displaceable along the output sleeves 122 and 124. Each take off wheel is attached by a yoke to a car 138 and 140 that is supported and guided by rod shaped rails 142 and 144 that are displaced above the take off wheels 130 and 132 and are parallel to shaft 102. The axial placement of the take off wheels 130 and 132 is controlled by the axial placement of cars 138 and 140 which are controlled by levers 154 and 156 respectively which may control both wheels in unison or separately. The speed and direction of rotation of both outputs sprockets 126 and 128 is separately controllable. Levers 146, 148, 150 and 152 control the distance of the transfer disks 112, 114, 116 and 118 from shaft 102 in the manner illustrated in FIG. 3 and function as a clutch to engage and disengage the power input from the power output.

It should be anticipated that the features of mechanisms 10, and 100 while specifically designed for use as a means for connecting a power source to a drive wheel of a vehicle, could be modified for use in other similar connections. Similarly, other means for connecting mechanisms 10, and 100 to a variety of alternative power sources are to be anticipated.

It should be further understood and anticipated that numerous materials could be utilized for the components of mechanism 10 provided the overall strength of the mechanism is sufficient to withstand the forces to be anticipated.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention.

I claim:

1. A power transmission mechanism comprising:
   A. a central shaft,
   B. at least one drive wheel with a rim mounted on the central shaft,
   C. for each drive wheel, at least one power takeoff wheel slidingly mounted on and axially positionable along the central shaft, each power takeoff wheel having a rim and being rotationally free with respect to the central shaft,
   D. for each drive wheel, at least one power transfer disk having a flat, unobstructed, round surface having a center point and being freely rotatable and slidingly mounted on an axle with an axis in the same plane as, and normal to the axis of the central shaft and means for biasing the power transfer disk away from the drive wheel and power take-off wheel rims and means for counteracting the biasing means to cause the flat surface of each power transfer disk to engage at least one power take-off wheel rim and one drive wheel rim, the power take-off wheel being axially positionable between points of engagement with the transfer disk surface on either side of the center of the transfer disk surface,
   E. power input means for transferring rotational force to the drive wheel, and
   F. power output means for transferring rotational force from the takeoff wheel to a use therefore.

2. The mechanism of claim 1 further comprising means for controlling the axial position of the takeoff wheel on the central shaft.

3. The mechanism of claim 2 further comprising, for each drive wheel, two power transfer disks mounted on opposing sides of the central shaft, drive wheel and takeoff wheel with the power transfer disk surfaces being parallel to each other.

4. The mechanism of claim 3 further comprising means for controlling the axial position of the drive wheel along the central shaft.

5. The mechanism of claim 4 wherein the power output means comprises a power output sleeve mounted on the central shaft, axially fixed and rotationally free with respect to the central shaft, the power take off wheel being rotationally fixed and axially positionable with respect to the power output sleeve, and means for transmitting the rotational force of the power output sleeve to a use therefore.

6. The mechanism of claim 5 wherein the power input means comprises a power input sleeve mounted on the central shaft, axially fixed and rotationally free with respect to the central shaft, the drive wheel being rotationally fixed and axially positionable with respect to the power input sleeve, and means for transmitting the rotational force from a power source to the power input sleeve.

7. The mechanism of claim 3 further comprising two drive wheels and two takeoff wheels.

8. The mechanism of claim 7 wherein the means for controlling the axial position of each takeoff wheel on the central shaft are separate and free to operate independently of each other.

9. The mechanism of claim 8 wherein the two drive wheels are mounted in proximity to each other and are each connected to a single power input means.

10. The mechanism of claim 9 further comprising a power output means for each takeoff wheel.

11. The mechanism of claim 10 wherein each power output means is connected to a wheel on either side of a wheeled vehicle in which the mechanism is mounted.

12. The mechanism of claim 9 further comprising two drive wheels and two takeoff wheels.

13. The mechanism of claim 12 wherein the means for controlling the axial position of each takeoff wheel on the central shaft are separate and free to operate independently of each other.

14. The mechanism of claim 13 wherein the two drive wheels are mounted in proximity to each other and are each connected to a single power input means.

15. The mechanism of claim 14 further comprising a power output means for each takeoff wheel.

16. The mechanism of claim 15 wherein each power output means is connected to a wheel on either side of a wheeled vehicle in which the mechanism is mounted.

* * * * *